(12) United States Patent
Schulz et al.

(10) Patent No.: US 6,180,222 B1
(45) Date of Patent: Jan. 30, 2001

(54) GOLD-CONTAINING NANOPOROUS ALUMINUM OXIDE MEMBRANES A PROCESS FOR THEIR PRODUCTION AND THEIR USE

(75) Inventors: Andreas Schulz, Neu-Isenburg; Günter Schmid, Velbert, both of (DE); Gabor Louis Hornyak, EverGreen, CO (US); Thomas Sawitowski, Essen (DE)

(73) Assignee: Cerdec Aktiengesellschaft Keramische Farben, Frankfurt (DE)

( * ) Notice: Under 35 U.S.C. 154(b), the term of this patent shall be extended for 0 days.

(21) Appl. No.: 09/133,804

(22) Filed: Aug. 13, 1998

(30) Foreign Application Priority Data

Aug. 13, 1997 (DE) ................................. 197 34 972

(51) Int. Cl.$^7$ ............................... B05D 1/18; B05D 3/02; B32B 3/26
(52) U.S. Cl. ...................... 428/317.9; 156/322; 427/181; 427/244; 427/295; 427/443.2; 428/338; 428/312.8
(58) Field of Search ............................... 428/220, 317.9, 428/338, 312.8; 156/322; 427/181, 244, 295, 443.2

(56) References Cited

FOREIGN PATENT DOCUMENTS

| 4411103 | 10/1995 | (DE) . |
| 4411104 | 10/1995 | (DE) . |
| 197 04 479 | 8/1998 | (DE) . |
| 0 857 707 A2 | * 8/1998 | (EP) ............................... C04B/41/88 |

OTHER PUBLICATIONS

Martin, "Membrane–Based Synthesis of Nanomaterials", Chem. Mater., vol. 8, No. 8, 1996, 1739–1746 (no month).
Foss, Jr. et al., "Template–Synthesized Nanoscopic Gold Particles: Optical Spectra and the Effects of Particle Size and Shape", J. Phys. Chem. 1994, 98, 2963–2971 (no month).

Preston et al., "Optical Characterization of Anodic Aluminum Oxide Films Containing Electrochemically Deposited Metal Particles. 1. Gold in Phosphoric Acid Anodic Aluminum Oxide Films", J. Phys. Chem. 1993, 97, 8495–8503 (no month).

Diggle et al., "Anodic Oxide Films on Aluminum", Chem. Rev. 1969, 69, 365–405.

Schmid, "Hexachlorododecakis(triphenyl–phosphine)pentapentacontagold, $Au_{55}[P(C_6H_5)_3]_{12}Cl_6$", Inorg. Synth. 1990, 214–218 (no month).

Schmid et al., "Large Transition Metal Clusters—VI.* Ligand Exchange Reactions on $Au_{55}(PPh_3)_{12}Cl_6$—The Formation of a Water Soluble $Au_{55}$ Cluster", Polyhedron, vol. 7, No. 8, 1988, 605–608 (no month).

* cited by examiner

*Primary Examiner*—Blaine Copenheaver
(74) *Attorney, Agent, or Firm*—Wenderoth, Lind & Ponack, L.L.P.

(57) ABSTRACT

Red decorations on substrates which can undergo decorative baking, such as glass, porcelain, ceramic and metal, can be produced using nanoporous aluminium oxide membranes according to the invention, the nanopores of which contain ligand-stabilized gold clusters. The membrane is applied to the substrate followed by baking, resulting in formation of the red color. Alternatively, the membrane can be converted into a red membrane by thermolysis, after which the membrane is employed for production of the decoration. The membranes according to the invention can be obtained by bringing a nanoporous $Al_2O_3$ membrane into contact with a solution of a ligand-stabilized gold cluster, in particular one of the formula $Au_{55}L_{12}X_6$, wherein L is a phosphane ligand and X is an anion.

12 Claims, No Drawings

GOLD-CONTAINING NANOPOROUS ALUMINUM OXIDE MEMBRANES A PROCESS FOR THEIR PRODUCTION AND THEIR USE

BACKGROUND OF THE INVENTION

The invention relates to nanoporous aluminium oxide membranes, the nanopores of which contain ligand-stabilized gold clusters, a process for their production and their use for the production of red decorations.

Purple pigments based on colloidal gold or precursors thereof in and/or on a particulate carrier material, such as a glass frit or a metal oxide, and their use for the production of decorations on glass, porcelain and ceramic have been known for a long time, reference being made to DE-OS 44 11 104 and DE-OS 44 11 103 by way of example. The purple color can indeed be shifted somewhat further into the red region by co-using a small amount of a silver compound, but a pure red pigment based on colloidal gold or an intensely red decoration after application of a gold-containing pigment precursor onto a substrate which is stable to baking, with subsequent baking, has not been previously obtainable.

It has been possible to eliminate another disadvantage of gold-containing decoration preparations which are already known for the production of purple-colored decorations, that is to say an inadequate stability to baking at temperatures of about/above 1,000° C., by using ligand-stabilized gold clusters in decoration preparations—see DE Patent Application 197 04 479.4. However, the purple color of the decoration was not changed, in comparison with other gold compounds, by using the gold cluster.

Nanoporous aluminium oxide membranes with hollow or solid gold fibrils in the pores are known—see C. R. Martin, Chem. Mater., vol. 8, no. 8 (1996), 1739–1746 and J. Phys. Chem. (1994), 98, 2963–2971. The gold can be deposited without a current or electrochemically. While the nanoporous $Al_2O_3$ itself is optically transparent, the membrane assumes a color in the range from red-purple to blue because of the gold deposit. The color shifts from red-purple to blue as the length to diameter ratio of the fibrils increases; as the diameter of the fibrils decreases (150 nm to 20 nm), there is a shift towards red (in FIG. 6 of this document, this has obviously been transposed from top to bottom).

Nanoporous $Al_2O_3$ membranes with spheroidal gold particles having a diameter of about 3 to 9 nm can be obtained by electrochemical deposition of gold in the pores of a nanoporous $AL_2O_3$ membrane obtained by anodic oxidation in phosphoric acid solution—see J. Preston et al., J. Phys. Chem. (1993), 97, 8495–8503. A cluster structure has been assigned to the gold particles of the size mentioned; the gold content was about 0.1 to 2 wt. %. There is no suggestion of using nanoporous $Al_2O_3$ membranes containing gold compounds or elemental gold particles as agents for production of red decorations on substrates which are stable to baking in the documents acknowledged above.

SUMMARY OF THE INVENTION

The object of the invention is to provide gold-containing agents, with the aid of which intensely red decorations can be produced on substrates which are stable to baking, such as glass, porcelain, ceramic and metal.

Nanoporous aluminium oxide membranes have been found which are characterized in that the nanopores contain ligand-stabilized gold clusters. By thermolysis of the membranes loaded with a ligand-stabilized gold cluster, the color changes from yellow-brown to red, and not to purple, as a consequence of the ligand shell being split off and ligand-free gold clusters being formed in the nanopores. Only the gold clusters contained in each pore can agglomerate to larger Au particles. Since the number of ligand-stabilized Au clusters per pore can easily be controlled via the concentration, the pore width and the thickness of the $Al_2O_3$ membrane and is limited, there is no impairment of the monodispersity of the Au particles during the thermolysis, and therefore also no further changes in color at higher temperatures.

DETAILED DESCRIPTION OF THE INVENTION

The ligand-stabilized gold clusters in the $Al_2O_3$ membranes containing nanopores can be used directly to produce red decorations on substrates which can be baked, because the red color can be formed during baking, which also serves as fixing, after application of the membrane to the substrate. Alternatively, the membrane can first be subjected to thermolysis for the purpose of splitting off the ligand shell, and the red-coloured membrane can then be applied and baked for decorative purposes.

The nanoporous aluminium oxide membranes on which the membranes according to the invention are based have been known for a long time and in some cases are also commercially obtainable. They have nanopores in a regular arrangement with a pore width in the range from about 1 to 500 nm and a depth of up to 500 µm. The pore density is usually in the range from $10^9$ to $10^{12}$ pores/cm$^2$. Overviews of the structure, production and properties of anodic oxide films in pore form are given by J. W. Diggle et al., Chem. Rev. 69, 365–405 (1969) and J. P. Gullivan et al., Proceeding of the Royal Society of London, 317 (1970), 51 et seq.; further references are to be found in C. A. Foss et al. J. Phys. Chem. (1994), 98, 2963–2971 and C. K. Preston et al., J. Phys. Chem. (1993), 97, 8495–8503. The nanoporous structures can be produced by anodic oxidation of aluminium surfaces in an aqueous solution containing a di- or triprotic acid. Sulphuric acid, oxalic acid, phosphoric acid and chromic acid, in particular, can be used as the acid. The anodic oxidation of aluminium for production of the membranes to be employed according to the invention is usually carried out at a low temperature, for example 0 to 5° C., and preferably using sulphuric acid or oxalic acid as the electrolyte, because thick, compact, and hard porous films are obtainable in this way. During production of the films, for example, a sheet of highly pure aluminium forms the anode in an electrochemical cell. The anodizing proceeds with precise monitoring of the potential and current. The pore diameter depends on the electrolyte, the temperature and the anodizing voltage, the diameter increasing as the voltage increases—a guideline value with sulphuric acid as the electrolyte being a pore width of 1.2 nm per volt of voltage applied. Thicker films can be produced using oxalic acid than using sulphuric acid. During the anodic oxidation, non-oxidized aluminium on the so-called barrier side can then be dissolved off or polished off in an acid bath in a known manner (see e.g. U.S. Pat. No. 4,687,551), nanoporous $Al_2O_3$ membranes with a closed (barrier side) surface and an open (i.e. pore openings) surface being obtained. During polishing of the membrane down to the base region of the pores, membranes with an open and a half-open (i.e. very small pore openings) side are first obtained, and during further polishing membranes with approximately equally wide pore openings continuous to both side are obtainable. Alternatively to this, continuous pores can also be obtained by etching with, for example, KOH in glycol, the membrane being placed with the barrier side on the etching bath.

Nanoporous $Al_2O_3$ membranes according to the invention containing ligand-stabilized gold clusters can contain ligand-stabilized gold clusters which differ in respect to the ligand and the number of Au atoms per cluster. There are known ligand stabilized clusters of gold and other precious metals with a magic number of 55, 309 and 561 metal atoms. The ligands may be monomeric or polymeric and contain one or more complexing atoms selected from the group of N, P, As and S. Useful monomeric ligands can be amines and N-heterocyclic compounds, like e.g. phenanthroline, phosphanes, sulfanes and triarylarsanes. Polymeric ligands can be selected from e.g. polyethylenimine, gelatine and polyvinylpyrrolidone. The gold clusters of nanoporous $Al_2O_3$ structures according to the invention are preferably those of the general structure $Au_{55}L_{12}X_{6/m}$, wherein L is the ligand and X is an anion of valency m. The ligand contains atoms responsible for the stabilizing, such as, for example, phosphorus, sulphur or nitrogen, phosphorus being particularly preferred. Among the phosphorus-containing ligands, aromatic phosphanes, such as, in particular, triphenylphosphane, tri-p-tolylphosphane and tri-p-anisylphosphane, as well as m-diphenylphosphinobenzenesulphonates $((C_6H_5)_2PC_6H_4\text{-}m\text{-}SO_3Me$ where $Me=H^+, Li^+, Na^+, K^+, NH_4^+$) are particularly suitable. Gold clusters with phosphane ligands are known—see G. Schmid et al. in Inorg. Synth. (1990) 214–218 and Polyhedron, vol. 7, 605–608 (1988). The gold cluster mentioned last is readily water-soluble and can therefore be employed in this form for loading the nanoporous structure. The other above-mentioned clusters are soluble in organic solvents, such as halogenated hydrocarbons or aprotic dipolar solvents, and are used in this form.

The nanoporous $Al_2O_3$ membranes with ligand-stabilized gold clusters in the pores can be open on one side, i.e. have pore openings only on one side. According to another alternative, the membrane has the actual mouth opening of the pores on one side and smaller pore openings on the opposite side; the smaller pore opening is preferably smaller than the diameter of the gold cluster. Finally, the membrane can be open on both sides and have continuous pores of approximately equal diameter. Preferably, the membrane is 5 $\mu$m to 500 $\mu$m, in particular 10 to 50 $\mu$m thick. The width of the pore opening is preferably in the range from 2 nm to 250 nm, preferably 2 to 100 nm, and in particular 10 nm to 70 nm.

The influence of the pore width on the red membranes or red decorations containing, in the pores, gold particles obtainable during the thermolysis can be seen from Example 2 below. As the pore size increases, the absorption maximum shifts to a shorter wavelength and the color impression therefore shifts from red to purple. It is thus possible to adjust the color in the red region in a controlled manner by the pore width. Preferred membranes according to the invention lead to gold particles having a diameter of substantially about 1.3 nm, corresponding to an $Au_{55}$ cluster, to about 20 nm, in particular 10 nm, during the thermolysis, which corresponds to coalescence of clusters.

Nanoporous aluminium oxide membranes according to the invention with ligand-stabilized gold clusters in the pores can be obtained in a simple manner by bringing the nanoporous $Al_2O_3$ structure which has been produced by anodic oxidation and is to be loaded, and an aqueous or organic solution of a ligand-stabilized gold cluster into contact with one another.

As a result of the contact, which can be achieved, in particular, by dipping, vacuum induction or electrophoresis, the pores are filled with the solution. In the dipping process, the solution is drawn into the pores by capillary forces, the ligand-stabilized gold cluster remaining in the pores after evaporation of the solvent. The loading depends on the contact time, the cluster concentration, the temperature and the pore width. With decreasing pore diameter and therefore increasing pore density, the loading increases due to the increasing internal surface of the membrane. Very dilute solutions of the ligand-stabilized gold clusters, in general about/below 1 mg/ml, are used for the loading. Loading by the dipping process can be promoted by prior evacuation.

According to another embodiment of the process, a nanoporous $Al_2O_3$ membrane which has one open surface and a half-open surface on the opposite side is employed. The term "half-open" means that the diameter of the pores on the half-open surface is substantially about or, in particular, smaller than the diameter of the ligand-stabilized gold cluster, that is to say about 1 to 2 nm. Loading is carried out by applying a vacuum to the half-open side and bringing the opposite side into contact with a gold cluster solution; the solution is drawn into the pores and the gold clusters remain held in the pores.

According to another embodiment, loading of a nanoporous $Al_2O_3$ membrane with or without a closed barrier layer is carried out by means of electrophoresis. In this process, one side of the membrane is brought into contact with a metal, which can be the original aluminium. If the Al has been dissolved off beforehand, one side of the $Al_2O_3$ structure can be subjected to vapor deposition or sputtering with a metal. The metal side is connected as the cathode, on top is the membrane to be loaded, the pore openings of which face the metal, and above this is the Au cluster solution, for example in a glass tube placed on the membrane; a graphite anode dips into the solution; a voltage is applied between the electrodes.

To modify the color shade, i.e. change the red shade of the decoration, color shade-modifying elements in the form of soluble compounds can be added in an effective amount to the solution containing a ligand-stabilized gold cluster and the combined solution can be employed for loading the nanoporous $Al_2O_3$ membrane. Elements which are suitable for modifying the color shade are, in particular, silver and other noble metals, as well as copper. The amount of color-modifying elements employed is in general less then 10 wt. %, based on the gold.

To convert the nanoporous $Al_2O_3$ membranes loaded with a ligand-stabilized gold cluster, preferably a cluster of the formula $Au_{55}L_{12}X_{6/m}$, where L, X and m have the meaning already given, into nanoporous membranes containing gold particles in the pores, the former are heat-treated at a temperature of at least 200° C., preferably at least 300° C. This heat treatment can be carried out on the membrane per se or on the membrane which has already been applied to a substrate which can be baked. During the thermolysis, the ligand shell of the cluster is destroyed and coalescence of some ligand-free clusters occurs; the color changes from yellow-brown to red. The wavelength of the red produced is determined, as already stated, by the pore width, and furthermore by the size of the Au particles formed, which in turn is controlled by the number of ligand-stabilized Au clusters per pore and of course the number of Au atoms per cluster, and by the optical purity and therefore the refractive index of the aluminium oxide. No serious changes in structure occur during the thermolysis, even at temperatures up to 1,000° C.: from the polymorphic starting material, γ-aluminium oxide is formed above 300° C. and A-aluminium oxide is formed above 800° C. Apart from the formation of the Au particles by splitting off and/or combustion of the ligand shell and coalescence of some Au clusters, the pore diameter enlarges to a small degree during the thermolysis, while the size of the membrane shrinks somewhat. The red membrane obtained during the heat treatment is optically transparent. If a ligand-stabilized gold cluster of the general formula $Au_{55}[(C_6H_5)_3P]_{12}Cl_6$ is employed for loading nanopores with a pore width in the range from about 10 to 70 nm and the thermolysis is carried out at 800° C., the majority of the Au particles formed in the vitreous structure have a size of about 10 nm. No further change in color occurs by a further increase in the temperature to 1,000° C. The resulting red membranes or red decorations are therefore distinguished by a high heat stability.

The $Al_2O_3$ membranes according to the invention containing ligand-stabilized Au clusters can be used directly or after thermolysis for the production of decorations on diverse substrates which can undergo decorative baking. The method of decoration comprises fixing the membrane, expediently after shaping of the membrane, for example to paillettes, on the substrate. Preferred substrates are glass, porcelain, ceramic and metals. Fixing of the pieces of membrane can be achieved solely by electrostatic effects or by means of an adhesive, for example an adhesive which burns without residue. If necessary, the membrane can be fixed to a layer of a glass-forming flux which has been applied to the substrate beforehand. The membrane is then baked at a temperature in the range from about 500 to 1,000° C., the membrane bonding to the surface of the substrate. In the case where a glass-forming flux, for example a glass frit, is present, this forms an anchor between the substrate and the membrane. To produce an overglaze decoration, the thermolytically non-treated or treated membrane is applied to a glazed layer which has already been baked or, preferably, is applied to a layer of glaze which has not yet been baked and is fixed permanently by baking.

As a result of the invention, it is possible to produce luminous red decorations based on colloidal gold which have a good stability to baking. Furthermore, either the membrane according to the invention or the red membrane accessible by thermolysis thereof can be employed for production of the decorations. The membranes can be produced in a readily reproducible form by the process according to the invention.

EXAMPLE 1

Production of nanoporous $Al_2O_3$ membranes: Extra-pure (99.999%) aluminium sheets (100 mm×60 mm) with a thickness of 2 mm were employed. The sheets were degreased using an aqueous potassium dichromate/phosphoric acid solution, and then electropolished in a phosphoric acid (60%)/sulphuric acid (39%)/glycerol (1%) mixture at 70–80° C. and a current density of 0.1 A/cm².

The sheets were anodized at 0–1° C., while stirring; further conditions are set forth in Table 1.

TABLE 1

| Voltage [V] | Electrolyte | Anodizing Concentration | Time [h] | Layer thickness [μ] |
|---|---|---|---|---|
| 15 | sulphuric acid | 15% | 18 | 40 |
| 20 | sulphuric acid | 20% | 16 | 50 |
| 40 | oxalic acid | 3% | 20 | 70 |
| 80 | oxalic acid | 1.5% | 15 | 50 |

After the membrane has been formed, the anodizing voltage is reduced in steps, until approx. 1 V is reached. The thickness of the barrier layer is reduced as a result. The approx. 1 nm thick layer which still remains is dissolved with 25% phosphoric acid and the hydrogen formed on the aluminium forces the membrane off the metal sheet. This process has been described by W. R. Rigbie et al. in Nature (1989, 337, p. 147).

The nanoporous $Al_2O_3$ membrane was loaded by dipping for 12 to 15 hours. The membrane was brought into contact with a solution of the ligand-stabilized gold cluster of the formula $Au_{55}[(C_6H_5)_3P]_{12}Cl_6$ in methylene chloride at a cluster concentration of 0.5 mg/ml. After drying, the membrane was thermolysed at 200° C. and then at 400° C.

EXAMPLE 2

Red films were obtained by thermolysis of membranes of different pore width at 800° C. and their absorption spectra were measured. The results can be seen from the table.

TABLE 2

| Shift in the absorption maximum with pore size | |
|---|---|
| Pore size (diameter) (nm) | Absorption maximum (nm) |
| 25 | 524 |
| 35 | 520 |
| 50 | 515 |
| 70 | 510 |

As the pore diameter increases, the absorption maximum shifts to shorter wavelengths. The optical impression therefore shifts from purple to red.

What is claimed is:

1. A nanoporous aluminium oxide membrane having pores which contain ligand-stabilized gold clusters.

2. The nanoporous aluminium oxide membrane according to claim 1, wherein the membrane is 1 to 500 μm thick, the pores are open on one or both sides of the membrane, and the pores have a diameter in the range from 2 to 100 nm.

3. The nanoporous aluminium oxide membrane according to claim 2, wherein the gold cluster has the general formula $Au_{55}L_{12}X_{6/m}$, wherein L is a stabilizing phosphorus-containing ligand and X is an anion of valency m.

4. The nanoporous aluminium oxide membrane according to claim 3, wherein the ligand L is selected from the group consisting of triphenylphosphane, tri-p-tolylphosphane, tri-p-anisylphosphane and diphenylphosphinobenzenesulphonates, and X is chloride.

5. The nanoporous aluminium oxide membrane according to claim 1, wherein the gold cluster has the general formula $Au_{55}L_{12}X_{6/m}$, wherein L is a stabilizing phosphorus-containing ligand and X is an anion of valency m.

6. The nanoporous aluminium oxide membrane according to claim 5, wherein the ligand L is selected from the group consisting of triphenylphosphane, tri-p-tolylphosphane, tri-p-anisylphosphane and diphenylphosphinobenzenesulphonates, and X is chloride.

7. A process for the production of the nanoporous aluminium oxide membrane according to one of claims 1 to 6, which comprises providing a nanoporous aluminium oxide membrane produced by anodic oxidation, and contacting the membrane with a solution of a ligand-stabilized gold cluster to fill the pores with the solution.

8. The process according to claim 7, wherein the contact of the membrane with the solution is by dipping, vacuum induction or electrophoresis.

9. A process according to claim 7, wherein the nanoporous aluminium oxide membrane has pores open on both sides of the membrane, the pore diameter being 1 to 2 nm on one side of the membrane and 10 to 100 nm on the opposite side, and a vacuum is applied to the side of the membrane having the smaller pore diameter to suck the solution of the ligand-stabilized gold cluster on the opposite side of the membrane into the pores.

10. The process according to claim 7, wherein the pores of the nanoporous aluminium oxide membrane are filled by electrophoresis by connecting as a cathode one side of the membrane in contact with a metal, bringing the opposite side of the membrane, which side contains the pores, into contact with a solution of a ligand-stabilized gold cluster, connecting as an anode an electrode extending into the solution, and applying a voltage between the cathode and anode.

11. A method of using the nanoporous aluminium oxide membrane according to claim 1 for the production of red decorations on substrates, which comprises applying the membrane directly or after thermolysis at not less than 200° C. to a substrate which can undergo decorative baking, and baking the membrane.

12. The method according to claim 11, wherein the substrate is selected from the group consisting of glass, porcelain, ceramic and metal.

\* \* \* \* \*